Nov. 1, 1938.  W. W. LOEBE ET AL  2,135,290
SEALING-IN APPARATUS FOR ELECTRIC LAMPS AND THE LIKE
Filed July 16, 1937   3 Sheets-Sheet 1

Inventors:
Walter W. Loebe,
Gustav Muller,
Kurt Weinmann,
by Harry E. Dunham
Their Attorney.

Inventors:
Walter W. Loebe,
Gustav Muller,
Kurt Weinmann,
by Harry E. Dunham
Their Attorney.

Nov. 1, 1938. W. W. LOEBE ET AL 2,135,290
SEALING-IN APPARATUS FOR ELECTRIC LAMPS AND THE LIKE
Filed July 16, 1937 3 Sheets-Sheet 3
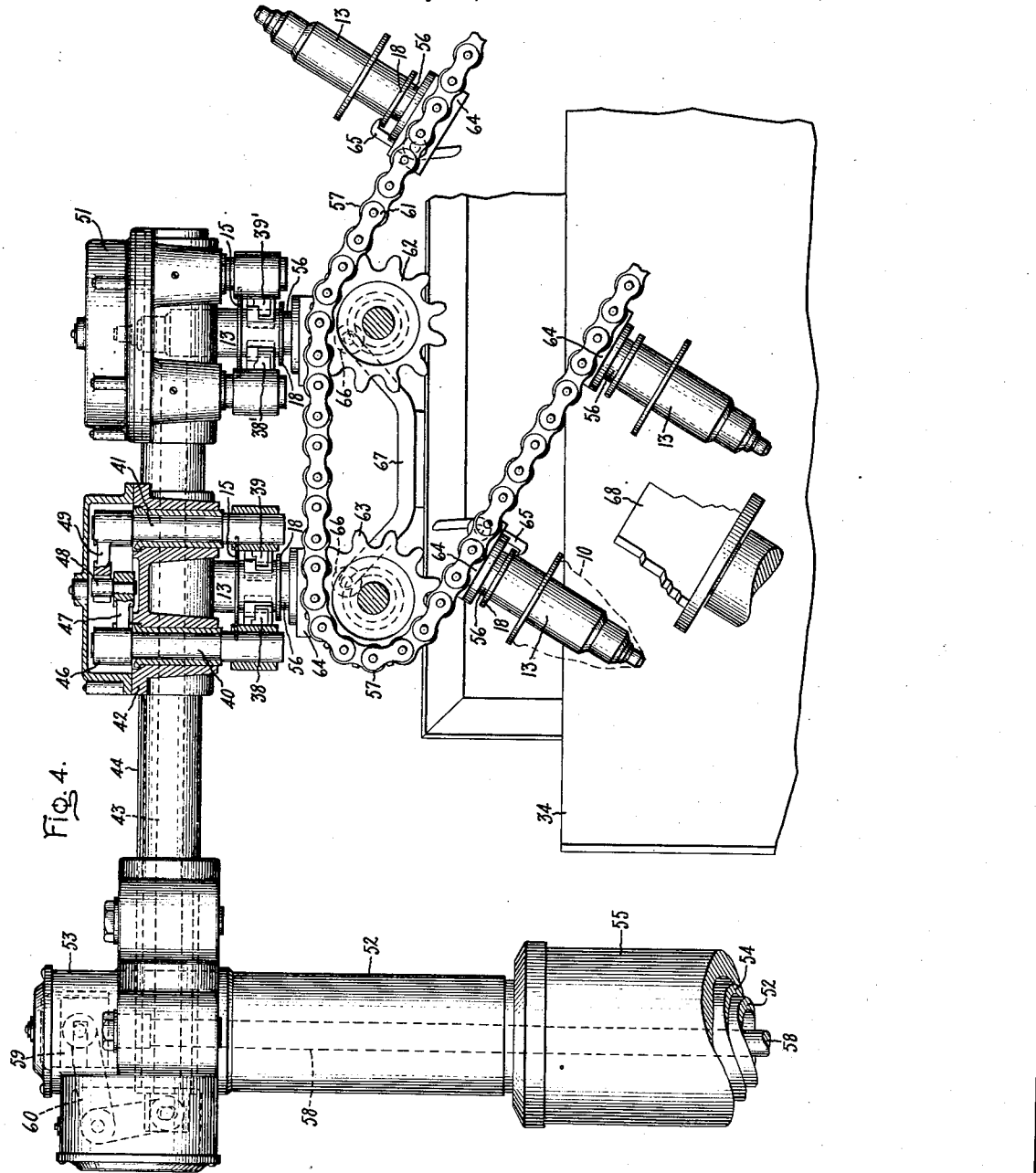
Inventors:
Walter W. Loebe,
Gustav Muller,
Kurt Weinmann,
by Harry E. Dunham
Their Attorney.

UNITED STATES PATENT OFFICE 2,135,290

SEALING-IN APPARATUS FOR ELECTRIC LAMPS AND THE LIKE

Walter W. Loebe, Berlin-Waidmannslust, Gustav Müller, Blankenfelde, and Kurt Weinmann, Berlin-Grunau, Germany, assignors to General Electric Company, a corporation of New York Application July 16, 1937, Serial No. 154,050
In Germany July 28, 1936

4 Claims. (Cl. 176—3)

Our invention relates to sealing-in apparatus for electric lamps and the like and more particularly to apparatus for removing the waste glass remaining on said apparatus after each sealing-in cycle. In the course of its operation, the sealing-in apparatus fuses the neck portion of a glass bulb to a glass stem which extends up into the interior of the bulb, and separates from the bulb the excess neck portion extending beyond said stem. This excess neck portion is generally referred to as cullet and must be removed from the sealing-in apparatus before the next operating cycle begins.

Prior to our invention the cullet was removed either manually or by a device which ejected it after the spindle on the head of sealing-in machine had been lowered to remove it from within the cullet. In both cases, however, pieces of glass often remain fused to the spindle and if these pieces are removed by shattering, they often enter other portions of the sealing-in apparatus. The principal object of our invention, therefore, is to provide apparatus for removing the cullet from the sealing-in apparatus in such a way that no splinters of glass enter the said apparatus.

According to our invention, the above object is attained by providing a removable flanged sleeve which is mounted on the sealing spindle and receives the cullet as it is severed from the remainder of the bulb, the said flanged sleeve with the cullet in place thereon being transferred to a position over a refuse hopper and then inverted so that the cullet falls into said hopper. In order to remove the cullet from sealing spindle when it is fused thereto, apparatus is also provided for shattering and forcibly cleaning it therefrom. Other features and advantages of our device will be apparent from the description which follows and from the drawings of one species thereof.

Figure 1:
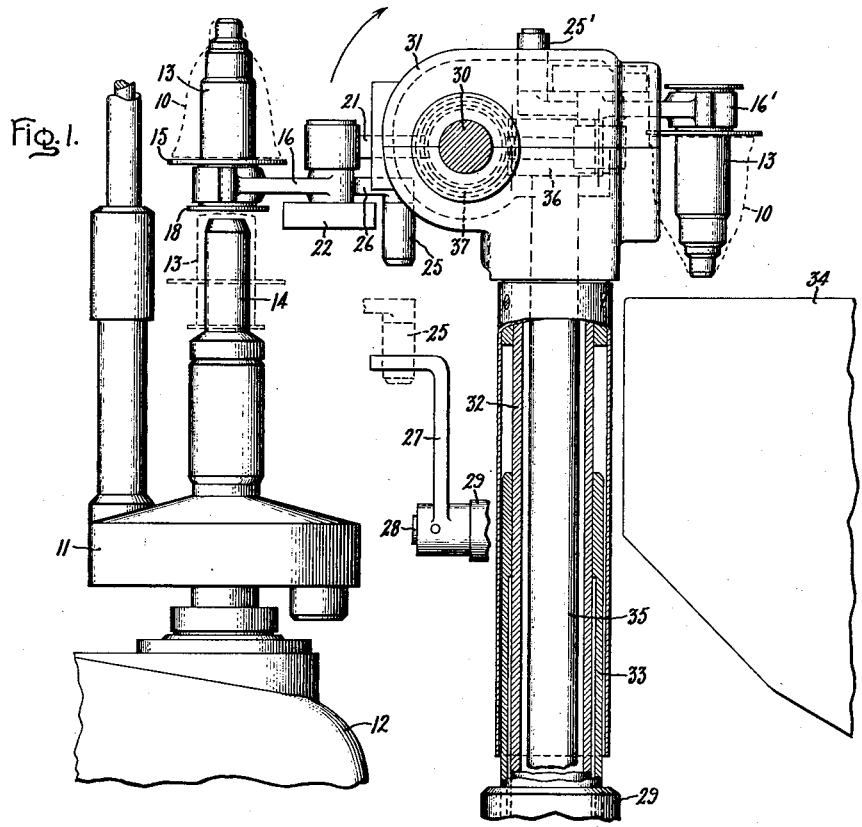
Figure 2:
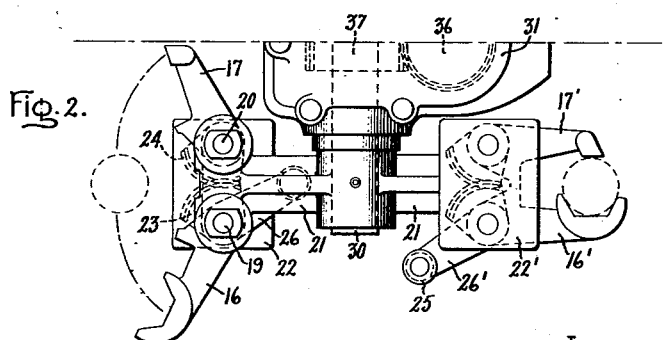
Figure 3:
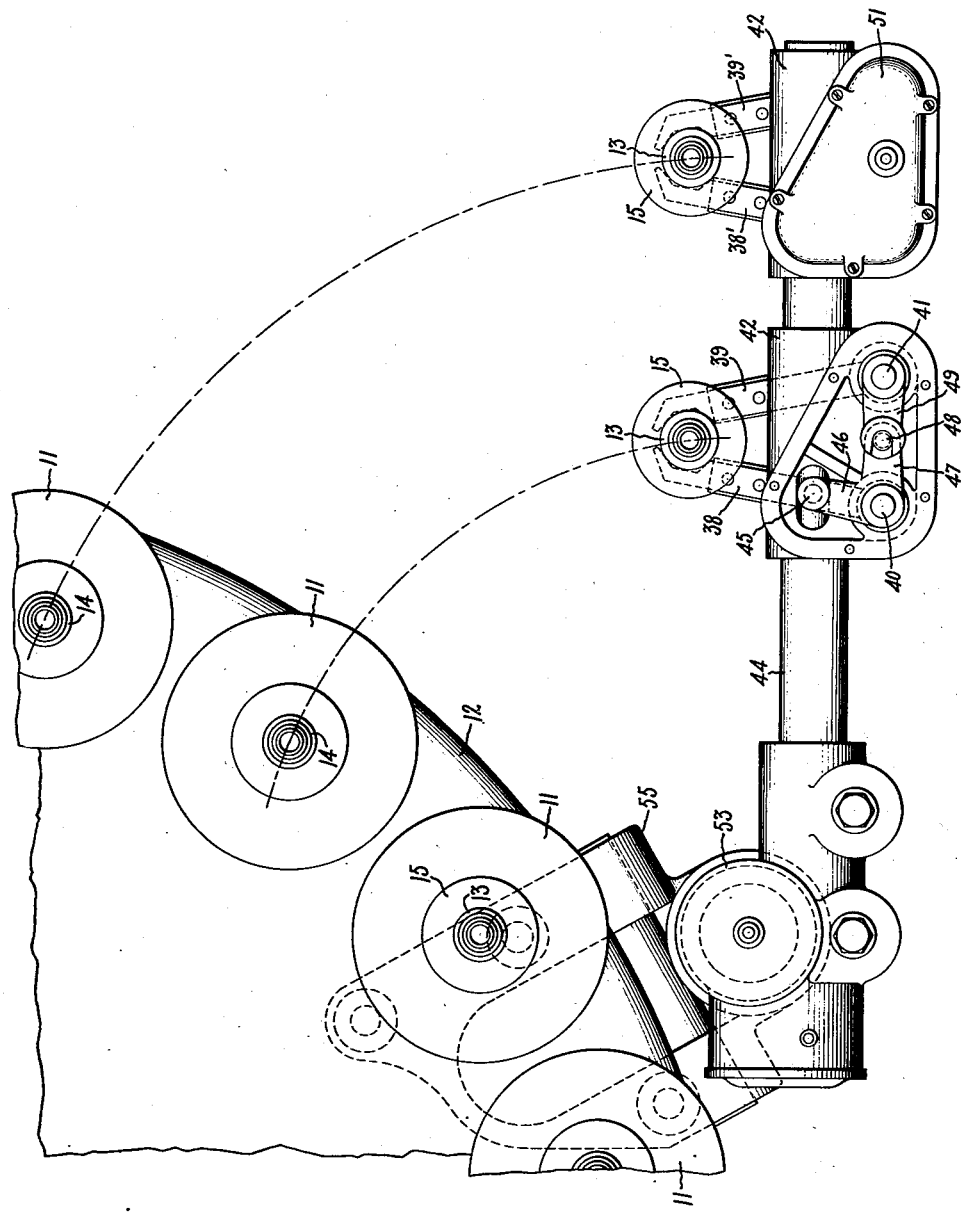

In the drawings Fig. 1 is a side elevation of one section of the apparatus of our invention; Fig. 2 is a plan view of one half of the apparatus; Fig. 3 is a plan view of a modified apparatus of our invention; and Fig. 4 is a side elevation of said modification and additional apparatus for co-operation therewith.

Referring to Figs. 1 and 2, apparatus is provided for simultaneously removing the cullet 10 (indicated in dotted lines) from each of two adjacent heads 11 of a sealing-in machine although only one sealing head 11 and only the portion of our apparatus for removing the cullet 10 therefrom is shown in Figs. 1 and 2. Both sealing heads 11 are indexed into position before the adjacent portion of our apparatus at the same time by movement of the turret 12 on which they are mounted and both portions of our apparatus are operated by common operating means, only partially shown, through the sealing-in machine, in order to be properly synchronized therewith. In each instance the sealing head 11 is provided with a removable sleeve 13 mounted on the sealing spindle 14 which supports the stem of the electric lamp or other device being sealed-in. The sleeve 13 is provided with a flange 15 to receive the cullet 10 which has been severed from the remainder of the bulb. The said sleeve 13 is located on the spindle 14 in the lower position shown in dotted lines when the sealing head 11 is indexed into position before the apparatus. The jaws 16 and 17, which are open as shown in Fig. 2, close on the portion of the said sleeve between the flanges 15 and 18 and move upward to a position somewhat higher than shown in Fig. 1. The jaws 16 and 17 are fastened to the pins 19 and 20 respectively which are pivoted in the beam or arm 21 and the plate 22 and are caused to move equal amounts by the intermeshing gear segments 23 and 24 thereon. The said beam 21 carries at its opposite end a second pair of jaws 16' and 17' just like the jaws 16 and 17. The jaws 16 and 17 are closed on the sleeve 13 by a spring (not shown) when the roller 25 on the arm 26 extending from jaw 16 is permitted to swing back to its normal position by the arm 27 which is mounted on the shaft 28 extending from the supporting frame 29 of our apparatus and which is operated by mechanism (not shown) operated by the sealing-in machine in the usual way. The vertical movement of the jaws 16 and 17 is produced by a similar movement of the beam 21 and the shaft 30 to which it is fastened which is mounted in the housing 31 on the end of the tube 32 and which extends through said housing 31 and supports the other duplicate cullet removing apparatus (not shown) hereinbefore referred to. The tube 32 is moved in the tube 33 extending from the frame 29 by the conventional type of mechanism (not shown) coupled to the sealing-in machine.

After being lifted from the spindle 14 of the sealing head 11, the sleeve 13 is swung to an inverted position over the hopper 34 by 180° rotation of the beam 21 and shaft 30 so that the cullet 10 drops into said hopper. This movement carries the jaws 16 and 17 into the position shown by the jaws 16' and 17' which in turn swing to the position shown by said jaws 16 and 17. The said movement is brought about by rotation of the shaft 35 and the gear 36 on its end which meshes with the gear 37 on shaft 30. The shaft 35 is rotated by the sealing machine through the conventional type mechanism (not shown). The jaws 16' and 17' are duplicates of the other jaws 16 and 17 and place a sleeve 13, from which the cullet 10 has previously dropped, onto the spindle 14 by moving down the necessary distance. This downward movement is produced by a corresponding movement of the housing 31 and carries the jaws 16 and 17 and spindle 14 into the hopper 34. At this time the arm 27 swings the arm 26' sideward, opening the jaws 16' and 17' and freeing the sleeve 13, and the sealing head 11 is immediately indexed out of position before our apparatus and another head is indexed into position. The parts of our apparatus associated with jaws 16' and 17 are duplicates of those associated with jaws 16 and 17 and are numbered with primed numbers accordingly. There is another set of jaws similar to jaws 16—17 and 16'—17' located on the opposite side of the housing 31 from said jaws 16—17 and 16'—17' which operate simultaneously therewith to remove the cullet from the other of two sealing heads 11 located before the apparatus.

A modification of our apparatus is shown in Figs. 3 and 4 which differs from that described above in that the sleeves 13 on each of two sealing heads 11 indexed into position before the device by the turret 12 are removed by a separate pair of jaws, 38—39 and 38'—39', which transfer said sleeves 13 to other apparatus which carries them into the hopper 34. In the modification, jaws 38 and 39 are attached to the pins 40 and 41 respectively mounted in the bracket 42 and are closed on the sleeve 13 by longitudinal movement of the rod 43 in the tubular arm 44 supporting the bracket 42 which is engaged by the pin 45 extending from the lever 46 on pin 40. The lever 46 is provided with an arm 47 having a pin 48 extending therefrom which engages the arm 49 on pin 41 and causes jaw 39 to be operated with jaw 38. The jaws 38' and 39' are correspondingly operated and in each case the lever 46 and arms 47 and 49 are protected by a cover plate 51 attached to the respective bracket 42 on the tubular arm 44. The jaws 38—39 and 38'—39' are brought into position before the sealing heads 11 by a swinging movement of the arm 44, and after gripping the sleeves 13 are raised to lift said sleeves 13 from the spindles 14. The upward movement occurs as the tubular post 52 which is connected to the arm 44 by the housing 53 is raised in the tubing 54 within the machine frame 55 and is followed by a swinging motion thereof carrying the sleeves 13 over pins 56 on the conveyor 57. These movements are caused by corresponding movements of the tubular post 52 which is actuated by means (not shown) of the usual type connected to the sealing-in machine. The sleeves 13 are now carried down on the pins 56 by movement of post 52, and the jaws 38—39 and 38'—39' are opened. The longitudinal movement of the rod 43 is caused by movement of rod 58 within the post 52 which is transferred thereto through the slotted block 59 and the lever 60 pivoted in the housing 53. The jaws 38—39 and 38'—39' are moved back from the conveyor 57 momentarily to give sufficient clearance for it to index the sleeves 13 and carry the cullets out of position and to bring a succeeding pair of sleeves 13 from which the cullets have been removed into position.

The conveyor 57 is comprised of two side-by-side endless chain belts 61 which pass over the sprockets 62 and 63 and which support at regular intervals the blocks 64 on which the pins 56 are mounted. When the conveyor 57 is indexed, the pawls 65 on the blocks 64 before the jaws 38—39 and 38'—39', pass from the rollers 66 on the stationary bar 67 and engage the lower flanges 18 on the sleeves 13 to hold them securely in place on pins 56. The indexing motion of the conveyor 57 carries the sleeves 13 to a position over the hopper 34 and into operation relation to a pair of tools 68 (only one being shown) which are rotated so as to strike the cullets 10 and break them from the sleeves 13. The shape of the tools 68 is such that all of the cullets 10, even that portion, if any, fused thereto, is swept therefrom.

The cleaned sleeves 13 which are indexed into position before the jaws 38—39—38'—39' are transferred to the spindles 14 of the heads 11 of the sealing-in machine by the return upward, sideward and downward movement thereof and the said jaws 38—39 and 38'—39' move back away from the turret 12 while the next pair of heads are indexed into position. The use of the conveyor 57 in the modification of our apparatus permits the stem which is to be sealed into the bulb to be introduced into the sealing-in machine with the cleaned sleeves 13.

What we claim as new and desire to secure by Letters Patent of the United States is:

1. In a device of the class described, the combination with a sealing-in machine comprising a turret having a plurality of heads thereon each having a spindle for supporting the stem of an electric lamp or similar article to be sealed in a glass bulb, of a removable sleeve on said spindle having a flange thereon for receiving and supporting the cullet severed from the neck of said bulb, and cullet removal apparatus located adjacent to the path of travel of said heads and comprising a pair of jaws, means for closing said jaws to grip a sleeve in one of said heads, and means for transferring said jaws to remove said sleeve with a cullet thereon away from said head and to invert said sleeve to cause the said cullet to drop therefrom.

2. In a device of the class described, the combination with a sealing-in machine comprising a turret having a plurality of heads thereon each having a spindle for supporting the stem of an electric lamp or similar article to be sealed in a glass bulb, of a removable sleeve on said spindle having a flange thereon for receiving and supporting the cullet severed from the neck of said bulb, and cullet removal apparatus located adjacent to the path of travel of said heads and comprising a plurality of pairs of jaws, means for closing one of said pairs of jaws to grip a sleeve in one of said heads, and means for transferring each of said pairs of jaws to remove the said sleeve with a cullet thereon away from said head and to invert said sleeve to cause the said cullet to drop therefrom and also to simultaneously cause another sleeve in one of the other of said pairs of jaws to be placed on the said spindle.

3. In a device of the class described, the combination with a sealing-in machine comprising a turret having a plurality of heads thereon each having a spindle for supporting the stem of an electric lamp or similar article to be sealed in a glass bulb, of a removable sleeve on said spindle having a flange thereon for receiving and supporting the cullet severed from the neck of said bulb, and cullet removal apparatus located adjacent to the path of travel of said heads and comprising a pair of jaws, a conveyor comprising an endless belt having pins extending therefrom, means for closing said pair of jaws to grip a sleeve in one of said sealing heads, means for transferring said jaws to remove said sleeve with a cullet thereon from said head and place it on one of the said pins on said conveyor, means for opening said jaws to release said sleeve, means for indexing said conveyor to remove said sleeve away from said jaws, and means for closing said jaws to grip a sleeve on another of the pins on said conveyor and carry it to the said sealing head.

4. In a device of the class described, the combination with a sealing-in machine comprising a turret having a plurality of heads thereon each having a spindle for supporting the stem of an electric lamp or similar article to be sealed in a glass bulb, of a removable sleeve on said spindle having a flange thereon for receiving and supporting the cullet severed from the neck of said bulb, and cullet removal apparatus located adjacent to the path of travel of said heads and comprising a beam rotatably mounted at its middle and having a pair of jaws at either end, means for closing one of said pair of jaws to grip a sleeve in one of said heads having a cullet thereon, the other pair of jaws being clamped on another sleeve in an inverted position, and means for raising said beam to remove said first-mentioned sleeve from said head and for rotating said beam about its middle half a revolution in a vertical plane and then lowering said beam to place said second-mentioned sleeve in said head.

WALTER W. LOEBE.
GUSTAV MÜLLER.
KURT WEINMANN.